March 26, 1963   P. DORNIER   3,082,976
AIRCRAFT WITH GROUND EFFECT LANDING GEAR
Filed June 30, 1961   3 Sheets-Sheet 2

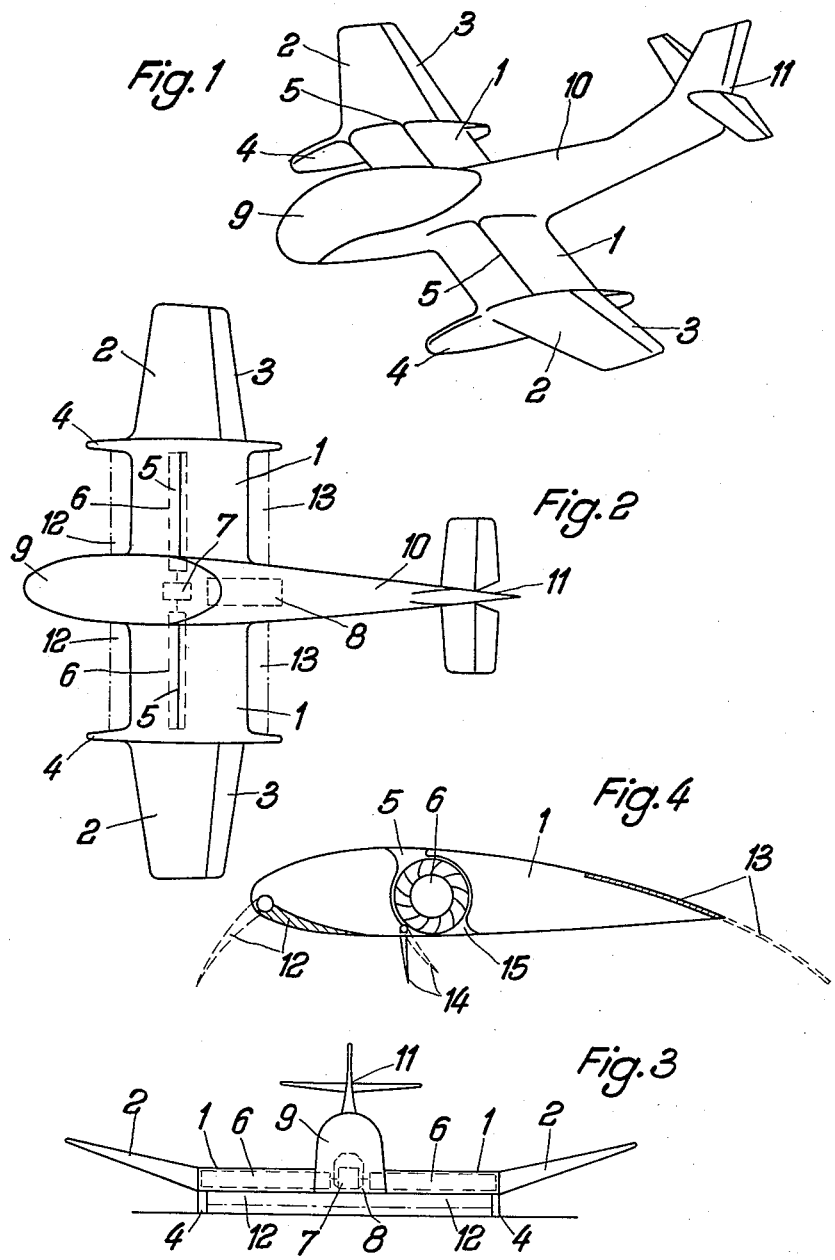

Inventor:
PETER DORNIER.
By K.A. May
Attorney.

March 26, 1963 P. DORNIER 3,082,976
AIRCRAFT WITH GROUND EFFECT LANDING GEAR
Filed June 30, 1961 3 Sheets-Sheet 3
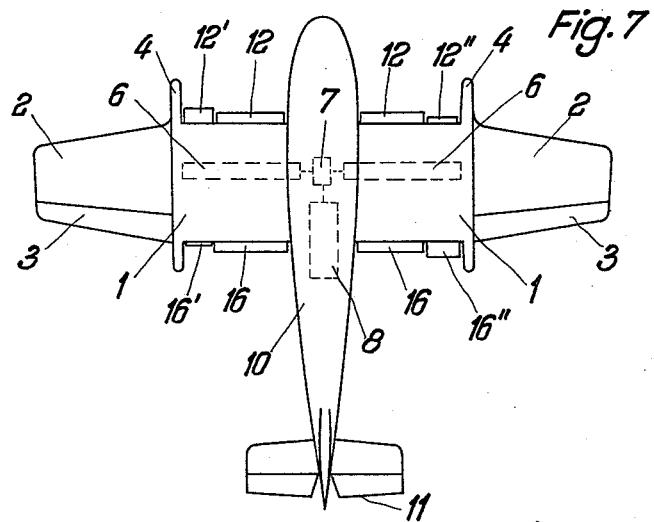
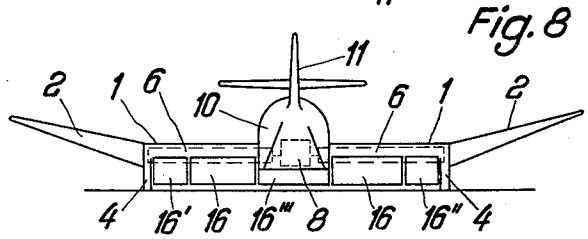
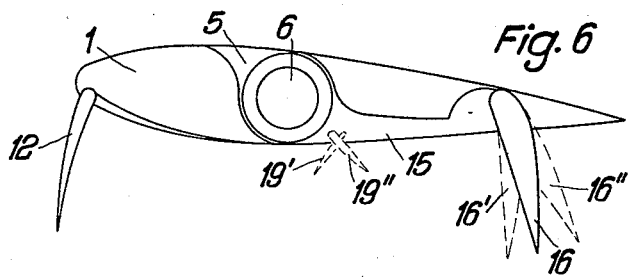
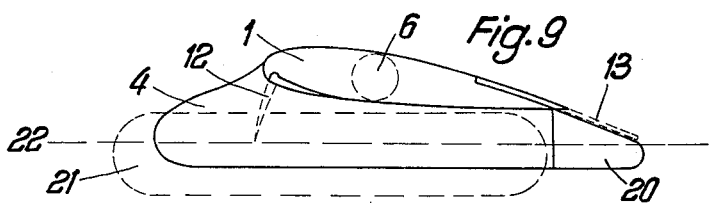
Inventor:
PETER DORNIER.
By K. B. Mayr
Attorney.

United States Patent Office 3,082,976
Patented Mar. 26, 1963

3,082,976
AIRCRAFT WITH GROUND EFFECT
LANDING GEAR
Peter Dornier, Friedrichshafen, Germany, assignor to Dornier-Werke G.m.b.H., Friedrichshafen, Germany, a firm of Germany
Filed June 30, 1961, Ser. No. 121,126
Claims priority, application Germany July 2, 1960
28 Claims. (Cl. 244—12)

The present invention relates to aircraft adapted to start in a vertical direction from and land on an air cushion produced by transverse flow blowers.

Conventional aircraft adapted to start vertically require fans consuming considerable power. Use of conventional transverse flow blowers which are relatively light and small and require less power has been proposed. With the conventional arrangements the lift coefficient is increased and the forward thrust may be increased. These arrangements are suitable only for hovering close to the ground, but cannot effect high-speed flight.

It is an object of the present invention to provide an aircraft using an air cushion for starting and landing in lieu of/or in addition to an undercarriage of the wheel and/or float type and being suitable also for high-speed flight.

A further object of the invention resides in the provision of an aircraft adapted for vertical take-off and landing and for high-speed flight which is simple, small, light, reliable, and inexpensive. In a modification of the aircraft according to the invention an undercarriage is entirely omitted whereby air resistance is reduced. The aircraft according to the invention has no propeller which must be placed at a considerable distance from the ground and the vertical extension of the aircraft is small. The cockpit which is provided in the nose of the fuselage forward of/or above an inner wing portion affords excellent visibility and convenient boarding. The motor for driving the transverse flow blowers is arranged in the fuselage in the rear of the cockpit and is not obstructive. Since the entire middle portion of the inner wing portion between the landing skids and, if desired, also the bottom of the fuselage is exposed to the air cushion which is confined between depending apronlike elements, take-off and landing is considerably facilitated and may be done on unprepared ground and on the water. The aircraft according to the invention is adapted to use one or more driving motors.

Since transverse flow blowers are arranged in the portion of the wings adjacent to the fuselage for producing the air cushion as well as forward thrust, a continuous transition from lift to forward flight, and conversely, can be effected simply and reliably by suitable flaps, or the like, associated with the blowers.

It is a further object of the invention to provide an aircraft for vertical take-off and landing and for high-speed flight which aircraft is amphibious and can be started by means of the air cushion from the ground, from snowfields, or from water. Sheetlike elements extending substantially vertically downward from the lateral sides of the inner portion of the wings and parallel to the longitudinal axis of the aircraft and forming a lateral confinement of the air cushion can easily be provided with skids broad enough to act as skis or forming floats. Inflatable elements may be placed adjacent to the sheetlike elements to act as floats. The aircraft according to the invention does not require wheels for landing and starting and does not require special hydrodynamic floats for landing and starting on and from water. Simply constructed skids are sufficient to support the aircraft on the ground and simply designed floats are sufficient for keeping the aircraft on the water.

The aircraft according to the invention is of the low-wing type, preferably having a straight central substantially rectangular wing portion. The lateral sides of the central wing portion are provided with sheetlike elements parallel to the longitudinal axis of the aircraft and extending in downward direction. The lower edges of the sheetlike elements are preferably formed as skids. The transverse flow blowers for producing lift and forward thrust are either entirely or partly placed in the central wing portion, the rotation axes of the blowers extending substantially in the direction of the wingspread.

Adjacent to the leading edge and to the trailing edge of the inner wing portion flaps or substantially flat elements are movably connected to the inner wing portion for extension from the wing portion to form confinements for the air cushion at a substantially right angle to the stationary sheetlike elements which are parallel to the longitudinal axis of the aircraft. The elements which are movably connected to the inner wing portion are retracted during high-speed flight.

During normal flight the required lift is provided in the usual manner by the wings of the aircraft and steering of the aircraft is effected in the conventional manner by means of a tail unit and ailerons.

The movable sheetlike elements forming aprons at the leading edge and at the trailing edge of the central wing portion are individually adjustable between end positions so that the ratio between the air escaping from the air cushion in forward direction and the air escaping from the air cushion in rearward direction below the edges of the respective aprons can be adjusted and, consequently, the ratio between forward thrust, drag and lift and to a certain extent also the angle of incidence of the wing can be adjusted. Normal steering devices are provided for normal flight. These devices, however, are useless when the aircraft is hovering, i.e., when there is little or no horizontal speed. Since there is no undercarriage, no steering can be done by an undercarriage. When hovering close to the ground there is only steering around the vertical axis of the aircraft required, which cannot be obtained with the conventional steering devices.

Conventional aircraft for vertical take-off and landing are provided with additional steering devices, such as jets, for this purpose. It is an object of the inevntion to provide an aircraft for vertical take-off and landing which does not require additional special devices for steering when the aircraft is hovering close to the ground. This object is obtained by connecting the movable aprons at the leading edges and at the trailing edges of the central wing portions and/or flaps, or the like, for guiding the air jets leaving the tranverse flow blowers at either side of the fuselage and moving the aprons and/or flaps at different sides of the fuselage in opposite directions. In this manner the air escaping below the aprons or leaving the blowers at different sides of the fuselage can be oppositely directed for steering the aircraft around its vertical axis.

The novel features which are considered characteristic of the invention are set forth with particularity in the appended claims. The invention itself, however, and additional objects and advantages thereof will best be understood from the following description of embodiments thereof when read in connection with the accompanying drawings wherein:

FIG. 1 is a perspective diagrammatic illustration of an aircraft according to the invention.

FIG. 2 is a diagrammatic plan view of an aircraft according to the invention.

FIG. 3 is a diagrammatic front view of the aircraft.

FIGS. 4, 5 and 6 are diagrammatic cross-sectional illustrations of three modifications of a central or inner wing portion of an aircraft according to the invention.

FIG. 7 is a diagrammatic plan view of a modified aircraft according to the invention.

FIG. 8 is a diagrammatic front view of the aircraft shown in FIG. 7.

FIG. 9 is a diagrammatic illustration of an inner wing portion and particularly of a sheetlike element connected thereto and provided with inflatable elements affording floating of the aircraft.

Figure 5:
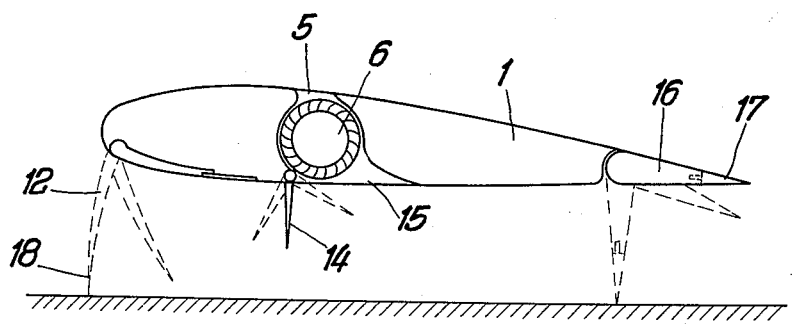

FIGS. 1 to 3 show the general structure of a low-wing monoplane having substantially rectangular inner wing portions 1 supporting a fuselage 10. A conventional tail unit 11 is mounted on the rear end of the fuselage. A substantially vertical sheetlike element 4 forming a skid extends downward from the lateral side of each wing portion 1. Outside of each skid or runner 4 is an outer wing portion 2, preferably shaped as a trapezoid. The portions 2 are preferably arranged in V-position as shown in FIG. 3. The wing portions 2 are provided with ailerons 3. There are slots 5 in the upper sides of the inner wing portions 1, extending in the direction of the wingspread. These slots form the intakes of transverse flow blowers 6 which are of conventional design and placed inside the wing portions 1 and shown in dotted lines in FIG. 2.

In the illustrated example a common drive 8 for rotating both blowers 6 via a transmission gear 7 is placed in the fuselage 10 in the rear of the cockpit 9. Other arrangements of the blowers and their drives are within the scope of the present invention provided the blowers are capable of producing an air cushion as well as forward drive. The blowers are placed coaxially. Instead of a single blower at either side of the longitudinal axis of the airplane a plurality of substantially coaxial blower units may be arranged on either side, or two or more blower units may be placed side by side with their axes in parallel relation. With this arrangement supporting elements, for example girders, may be placed between the blowers. The blowers may be driven by separate motors or by a common motor, as shown.

As seen in FIGS. 2 and 3 the blowers may have portions extending into the fuselage 10. These portions may serve to produce lift as well as propulsion or, if desired, may be used entirely or in part for other purposes, for example, for providing cooling air for the driving motor which is placed in the fuselage, or for supplying combustion air and/or for precompressing combustion air for gas turbines.

FIG. 4 shows a blower 6 and an air intake slot 5 in a wing element 1. An air outlet 15 is provided in the bottom side of the wing element. The rate of flow of air through and the direction of the air flow from the outlet are controlled by a flap 14. The leading edges and the trailing edges of the wing elements 1 are provided with adjustable elements 12 and 13 which supplement the surfaces of the wing elements 1. The element 12 at the leading edge of the element 1 is formed by a downwardly swingable flap and the element 13 is adapted to provide a trailing edge in the rear of the trailing edge of the wing element 1. The active or extended positions of the elements 12 and 13 are shown in dotted lines in FIG. 4. If desired, instead of the illustrated elements 12 and 13 other conventional devices having the same effect may be used. The flap may be arranged at the trailing edge and the extendable surface may be placed at the leading edge. The elements 12 and 13, when in extended position, enlarge the surface of the wing element 1 for increasing the lift effect of the air cushion. The extended elements 12 and 13 together with the skids 4 form aprons confining a space between the wing elements 1 and the ground promoting the development of the air cushion. The lateral extension of the elements 12 and 13 need not be confined to the lateral extension of the wing elements 1. The elements 12 and 13 may, if desired, extend below the fuselage.

FIG. 5 shows a modification of the central wing elements. In lieu of the extendable element 13 shown in FIG. 4 a flap 16 is mounted on the trailing edge of the element 1. The elements 12 and 16 which form aprons for confining the air producing the air cushion, are individually adjustable to be set in any desired position between two end positions. Several possible positions are indicated by dotted lines in FIG. 5. The apron-forming elements 12 and 16 are preferably made entirely or in part of elastic material in order to avoid damage upon contact with the ground and/or to afford adaptation of the outer edges of the aprons to the ground formation. The aprons may be rigid in part and be provided with elastic marginal portions for the aforesaid purpose. In the illustrated example an elastic sheetlike part 18 extends from the free end of the flap 12. A more substantial elastic part 17 is connected to the end of the flap 16 and is provided with a tongue extending into a corresponding slot in the free end of the rigid part of the flap 16. The elastic portions may be made of rubber, or of a material having the same effect and are easily exchanged when worn.

As in the example shown in FIG. 4, a control element 14 is provided adjacent to the air outlet 15 for controlling the rate of flow as well as the direction of the air leaving the blower 6. In the illustrated example the element 14 is shown as a flap in several operating positions.

The aforedescribed arrangement operates as follows: When it is desired to produce an air cushion for lifting the aircraft from the ground the flaps 12 and 16 are brought into a position as shown in heavy dotted lines in FIG. 5. After the airplane has left the ground it remains hovering at a low elevation. The transverse flow blower is used also for producing forward thrust so that the airplane performs a normal horizontal start on the air cushion instead of on the ground. Starting in this manner is very simple and entirely independent on the character of the ground. Transition from vertical to horizontal flight is effected by changing the rate of flow of the air escaping from the air cushion by suitable adjustment of the position of the flaps 12 and 16 whereby the ratio between the air escaping below the forward flap 12 and the air escaping below the rear flap 16 is changed. The air escaping from the air cushion at the trailing edge of and below the flap 16 produces forward thrust and horizontal movement of the aircraft. The relation between lift and forward thrust depends on the position of the flaps 12 and 16. By individually adjusting the positions of these flaps a continuous transition from hovering to horizontal flight can be obtained. When doing this the angle of incidence of the airplane wings can be simultaneously changed within certain limits. The steering and control device 14 assists these operations by influencing the outlet direction of the air jet and, consequently, the forward thrust as well as the lift. After starting the aircraft the flaps or apron elements 12 and 16 are no longer needed and they are retracted into the wing element 1 for high-speed flight. The required lift is now produced by the wings in the conventional manner. By suitable adjustment of the position of the element 14 the angle of incidence of the wings can still be changed.

When landing the aircraft according to the invention the ratio between the air escaping below the aprons is adjusted by changing the position of the flaps 12 and 16 and of the control element 14 to produce a drag or braking effect.

The air inlet aperture 5 of the transverse flow blower 6 on the upper side of the wing element 1 is preferably so devised that the blower influences the boundary layer at the upper side of the wing element 1. By removing the boundary layer by suction the resistance of the wing at high-speed flight is reduced in the known manner and the lift coefficient is increased.

The flap 12 at the leading edge of the wing element 1 is preferably of the automatically operating type, i.e., it is so constructed that it is extended when the aircraft stands still. It is extended by dropping down, for example, due to its own weight when the aircraft stands still. This automatic operation of the flap 12 may also be obtained by providing additional weights or springs. When in extended position, the flap 12 is in contact with the ground or with water. Upon transition to forward flight the flap 12 is pressed rearward by the increasing impact pressure of the air and assumes a middle position which depends on the relation between the impact pressure and the pressure produced by the blower below the wing. The impact pressure increases upon increasing speed of the aircraft and the flap is pressed against the lower surface of the wing element 1. The operation is converse during landing of the aircraft. The flap is pressed forward and automatically extended when approaching the ground by the drag produced by the blower. The extended flap acts as an apron confining the air cushion formed above the ground on which cushion the aircraft rests.

FIG. 6 illustrates a modification of the central wing element 1. The blower 6 and the flap 12 are arranged in the same manner as in the aforedescribed examples. The apron element arranged at the trailing edge of the wing element 1 is formed by a flap 16 which may be aerodynamically balanced. The apparatus associated with the blower for controlling the rate of flow of air and/or the direction of the air flow leaving the blower is formed by a flap 19 which may be provided in addition to the apparatus 14 shown in FIGS. 4 and 5. The flap 16 and the flaps 14 and/or 19 may be mechanically coupled for simultaneous adjustment of the positions of the flaps. The coupling mechanism may be so arranged that the position of the flap 19 which is placed in the rear of the rotation axis of the blower 6 is less changed, for example, by one half of the degree to which the position of the apron 16 is changed. If a flap 14 is provided forward of the rotation axis of the blower 6, the position of the flap 14 may be changed substantially at the same degree as the change of position of the apron 16 or may be increased up to twice the change of the position of the apron 16. It is of advantage to make the coupling mechanism for the individual flaps individually adjustable for changing the relation of the extents of the simultaneous change of position of the flaps.

In the modification shown in FIGS. 7 and 8 the flaps provided at the edges of the wing elements 1 are not continuous but are subdivided in the direction of the wingspread of the aircraft. The inner partial flaps at the trailing edge of the wing elecents 1, i.e. the flaps which are adjacent to the fuselage, are designated by numerals 16 in FIGS. 7 and 8. The left outer partial flap which is adjacent to one of the skids 4 is designated by numtral 16′ and the right outer flap which is also adjacent to one of the skids 4 is designated by numeral 16″. FIG. 8 shows also an apron formed by a flap 16‴ which is mounted to the underside of the fuselage for confining the air cushion thereat. The central flap 16‴ may be either combined with the lateral flaps 16 or may form an independent flap, the latter being preferred if the bottom of the fuselage 10 extends below the wing element 1. For steering the aircraft only the outer flaps 16′ and 16″ are operated in opposite direction. As seen in FIG. 7, the left partial flap 16′ is in a more vertical position than the right partial flap 16″. The rearwardly directed air jet developing below the flap 16″ produces torque about the vertical axis of the aircraft. If desired, also the flaps 12 provided at the leading edge of the wing elements may be subdivided so as to form a left outer partial flap 12′ and a right outer partial flap 12″. By adjustment of these outer partial flaps in opposite direction, for example, by opening the left flap 12′ and closing the right partial flap 12″ an air jet will blow in forward direction below the flap 12′ and produce drag which assists the torque produced by the right rear partial flap 16″.

Operation of the flaps shown in FIG. 6 is simple, because the flap 12 at the leading edge of the wing element 1 adjusts itself automatically and the adjustment of the position of one or more flaps 14, 19 is coupled with the adjustment of the flap 16 placed at the trailing edge of the wing element 1. Three operating positions of the outer flaps are shown in FIG. 6. The position shown in solid lines corresponds to the position of the inner flaps 16, i.e., of the flaps which are close to the fuselage as seen in FIGS. 7 and 8. In this position the flap 16 acts as an apron confining the air cushion. The position 16′ shown in dotted lines in FIG. 6 corresponds to the position of the left outer partial flap 16′ shown in FIGS. 7 and 8 and the position 16″ shown in FIG. 6 corresponds to the position of the right outer partial flap 16″ shown in FIGS. 7 and 8. It is of advantage to elastically couple the outer partial flaps which are used for steering with the main inner flaps which serve as aprons. FIG. 6 shows two operating positions of the flap 19. When the flap is in the position 19′ a drag is produced and when the flap is in the position 19″ forward thrust is produced. If the flaps 19 at opposite sides of the fuselage 10 are placed in opposite positions, a torque is produced for steering the aircraft around its vertical axis. Control of the flap 19 may be used for steering or for assisting steering the aircraft while hovering.

In order to steer the aircraft when hovering around its vertical axis, the aprons at either side of the fuselage are oppositely adjusted for throttling, for example, escape of air below the left apron by farther extending the flap 16 while retracting the right flap so that a rearwardly directed air jet effects rotation of the aircraft around its vertical axis.

FIG. 9 is a schematic cross-sectional illustration of a central wing element 1 including a transverse flow blower 6. A flap 12 is provided at the leading edge of the wing and a flat element 13 is provided at the trailing edge of the wing. A skid 4 is provided as lateral confinement for the air cushion developing below the wing element 1. The rear end of the skid 4 is provided with a flap 20 or is constructed to form such a flap which is swingable about a vertical axis. The flap 20 swings within the air space which is confined by the elements 12 and 13. The air escaping in rearward direction between the ground and the element 13 is laterally diverted by the flap 20. This affords steering of the hovering aircraft around its vertical axis. The aircraft rests on the skids 4 when on the ground. As stated before, the skids also serve for laterally confining the space below the wing element 1 and, together with the extended apron elements at the leading edge and at the trailing edge of the wing element 1, increase the air cushion effect.

The lateral confinements of the air spaces below the wing elements 1 may be constructed in a manner other than that described above. In lieu of the skids a conventional low undercarriage may be provided adjacent to which a smooth vertical surface is arranged for forming a confining wall for the space for the air cushion and, if desired, for shrouding the undercarriage. A portion of this vertical wall may be formed as a flap, for example, like the flap 20 of FIG. 9, for steering purposes. If skids are provided, small rollers may be built in or laterally supported by the skids and project only little therefrom. This makes the aircraft more mobile than landing skids without rollers.

The invention is also applicable to amphibious aircraft. In this case the flaps 20 at the rear ends of the lateral confinement walls of the space for the air cushion are adapted to extend below the water line designated by numeral 22 in FIG. 9. In this way the flaps 20 serve as rudders when the aircraft is on the water as well as for steering when the aircraft is in the air.

The apparatus for steering the hovering aircraft around its vertical axis may be connected to the conventional cockpit steering mechanism so that no additional manipulation is required for steering the hovering aircraft. The apparatus for steering the hovering aircraft is preferably automatically disconnected from the conventional steering mechanism when the aircraft is in high-speed flight. This disconnection is effected in response to the position of the aprons confining the space for the air cushion.

The aircraft according to the invention is suitable to be lifted from the ground which may be covered with snow, and also from water. For the latter purpose the skids extending from the outside of the elements 1 are made to float and have a broad base. This also affords starting and landing on snow. The skids may be constructed to form floats or inflatable elements 21 may be provided adjacent to one or both sides of the skids 4. These floats, which are shown in dotted lines in inflated position in FIG. 9, may be connected to or arranged laterally spaced from the skids 4. When inflated, the floats preferably extend below and/or forward beyond the periphery of the rigid skids 4. In this way a buffer effect is produced in case of collision with objects in or floating on the water.

When using inflatable floats parts of the floats may still be in the water after the air cushion for lifting the aircraft has been formed. This causes a considerable resistance against horizontal movement. It is, therefore, recommended to remove all or part of the air by suction from the interior of the floats immediately after an air cushion has been formed below the wings which is sufficient for the vertical start. This is of advantage particularly at heavy sea because, then, a relatively small resistance is produced only by the narrow skids 4.

I claim:

1. Low-wing aircraft comprising, in combination, a fuselage, wings for producing lift during flight, said wings having inner portions extending from the lower portion of said fuselage and outer portions, sheetlike elements extending substantially vertically downward from the lateral sides of said inner wing portions parallel to the longitudinal axis of the aircraft, and transverse flow blowers built into said inner wing portions and having rotation axes extending substantially normal with respect to the longitudinal axis of the aircraft, said blowers having inlets at the top side of said inner wing portions and outlets at the bottom side of said inner wing portions for producing an air cushion below said inner wing portions and between said sheetlike elements for lifting the aircraft from the ground and for producing forward thrust.

2. Aircraft as defined in claim 1 wherein said inner wing portions are substantially rectangular.

3. Aircraft as defined in claim 1 wherein said sheetlike elements are provided with skids.

4. Aircraft as defined in claim 1 comprising regulating means operatively connected to said inner wing portions adjacent to said transverse flow blowers for regulating the rate of flow of air through and the direction of the air flow from said transverse flow blowers.

5. Aircraft according to claim 4 wherein the regulating means connected to one of said inner wing portions and the regulating means connected to the second inner wing portion are adjustable in opposite directions.

6. Aircraft as defined in claim 1 including flaps swingably connected to the rear ends of said sheetlike elements to swing around vertical axes for controlling the direction of the air rearwardly escaping from the air cushion between said elements for turning the aircraft around the vertical axis thereof.

7. Aircraft according to claim 6 wherein the lower edges of said sheetlike elements constitute skids.

8. Aircraft according to claim 6, including undercarriages, said sheetlike elements being formed as shrouds for said undercarriages.

9. Aircraft as defined in claim 1 wherein said sheetlike elements are provided with skids having a configuration affording floating of the aircraft.

10. Aircraft according to claim 9, including flaps swingably connected to the rear ends of said sheetlike elements to swing around vertical axes and adapted to dip into the water when the aircraft is on the water.

11. Aircraft as defined in claim 1 including inflatable elements placed adjacent to said sheetlike elements for floating the aircraft upon inflation of the inflatable elements.

12. Aircraft according to claim 11 wherein said inflatable elements have portions extending forward of said sheetlike elements upon inflation of said inflatable elements.

13. Aircraft according to claim 11 wherein said inflatable elements have portions extending below said sheetlike elements upon inflation of said inflatable elements.

14. Aircraft as defined in claim 1, including drive means for driving said blowers, said drive means being placed in said fuselage.

15. Aircraft according to claim 14 wherein said fuselage includes a cockpit, said drive means being placed in the rear of said cockpit.

16. Aircraft as defined in claim 1, wherein said blowers extend partly into said fuselage.

17. Aircraft comprising wings for producing lift during flight, said wings having inner portions and outer portions, sheetlike elements extending substantially vertically downward from the lateral sides of said inner wing portions parallel to the longitudinal axis of the aircraft, transverse flow blowers built into said inner wing portions and having rotation axes extending substantially normal with respect to the longitudinal axis of the aircraft, said blowers having inlets at the top side of said inner wing portions and outlets at the bottom side of said inner wing portions for producing an air cushion below said inner wing portions and between said sheetlike elements for lifting the aircraft from the ground and for producing forward thrust, sheetlike members movably connected to said inner wing portions adjacent to the leading and trailing edges of said inner wing portions and adapted to extend downward therefrom for confining a space below said inner wing portions and between said sheetlike elements for promoting production of the air cushion, regulating means operatively connected to said inner wing portions adjacent to said transverse flow blowers for regulating the rate of flow of air through and the direction of the air flow from said transverse flow blowers, and connecting means individually operatively connecting said sheetlike members connected to the trailing edges of said inner wing portions and said regulating means connected to the same inner wing portion for simultaneous operation of said last mentioned sheetlike members and of said regulating means.

18. Aircraft according to claim 17 wherein said connecting means include means for changing the relative extent of operation of said sheetlike members connected to the trailing edges of said inner wing portion and of said regulating means.

19. Aircraft comprising wings for producing lift during flight, said wings having inner portions and outer portions, sheetlike elements extending substantially vertically downward from the lateral sides of said inner wing portions parallel to the longitudinal axis of the aircraft, transverse flow blowers built into said inner wing portions and having rotation axes extending substantially normal with respect to the longitudinal axis of the aircraft, said blowers having inlets at the top side of said inner wing portions and outlets at the bottom side of said inner wing portions for producing an air cushion below said inner wing portions and between said sheetlike elements for lifting the aircraft from the ground and for producing forward thrust, and sheetlike members movably connected to said inner wing portions adjacent to the leading and trailing edges of said inner wing portions and adapted to extend downward therefrom for confining a space below said inner wing portions and between said sheetlike elements for promoting production of the air cushion.

20. Aircraft according to claim 19 wherein said sheetlike members are adapted to extend forward of the leading edges and rearward of the trailing edges of said inner wing portions to increase the surface of the latter acted upon by the air cushion.

21. Aircraft according to claim 20 wherein said sheetlike members have free outer edges and are adapted to be individually placed in positions leaving a space between the ground and said free outer edges permitting escape of air from said space to selectively provide drag and forward thrust and affording change of the angle of incidence of said wings.

22. Aircraft according to claim 20, including flaps swingably connected to the rear ends of said sheetlike elements to swing around vertical axes and adapted to swing below said sheetlike members which are movably connected to said inner wing portions adjacent to the trailing edges thereof when said last mentioned sheetlike elements are in extended position.

23. Aircraft according to claim 19 wherein said sheetlike members connected to the leading edges of said inner wing portions are in the form of flaps hanging down by gravity when the aircraft is at rest and assuming a rearwardly inclined position defined by the decreasing pressure of the air cushion acting on said flaps from the inside of said space and defined by the increasing impact pressure of the air acting on said flaps outside of said space upon transition of the aircraft from lifting to forward flight.

24. Aircraft according to claim 23 wherein the shape of said flaps corresponds to the shape of said inner wing portions adjacent to the leading edges thereof and said flaps rest flushly on said inner wing portions when the aircraft is in high-speed flight.

25. Aircraft according to claim 19 wherein said sheetlike members are made at least in part of elastic material.

26. Aircraft according to claim 19 wherein said sheetlike members comprise a rigid inner portion and an outer portion removably connected to said inner portion and made of elastic material.

27. Aircraft according to claim 19 wherein said sheetlike members connected to one of said inner wing portions and said sheet like members connected to the second inner wing portion are adjustable in opposite directions.

28. Aircraft according to claim 19 wherein said sheetlike members are subdivided to form separately movable partial sheetlike members, the partial sheetlike member connected to one of said inner wing portions and relatively distant from the longitudinal axis of the aircraft and the partial sheetlike member connected to the second of said inner wing portions and relatively distant from the longitudinal axis of the aircraft being adjustable in opposite directions.

References Cited in the file of this patent

UNITED STATES PATENTS

| | | |
|---|---|---|
| 2,483,663 | Nowak | Oct. 4, 1949 |
| 2,989,269 | Le Bel | June 20, 1961 |

FOREIGN PATENTS

| | | |
|---|---|---|
| 1,040,907 | Germany | Oct. 9, 1958 |